US011237338B2

(12) United States Patent
Zhang et al.

(10) Patent No.: US 11,237,338 B2
(45) Date of Patent: Feb. 1, 2022

(54) OPTICAL ELEMENT HOLDER WITH A PROTRUDING FEATURE TO HOLD A CHAMFERED OPTICAL ELEMENT

(71) Applicant: Lumentum Operations LLC, San Jose, CA (US)

(72) Inventors: Yiduo Zhang, Cupertino, CA (US); Bryan Paolini, Fremont, CA (US); Michael Lovelady, Mountain View, CA (US); Titus Whitehead, Sunnyvale, CA (US); Gilberto Madrid, Los Altos, CA (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 16/884,670

(22) Filed: May 27, 2020

(65) Prior Publication Data

US 2021/0199896 A1     Jul. 1, 2021

Related U.S. Application Data

(60) Provisional application No. 62/954,234, filed on Dec. 27, 2019.

(51) Int. Cl.
*G02B 6/24*     (2006.01)
*G02B 6/36*     (2006.01)
(Continued)

(52) U.S. Cl.
CPC .......... *G02B 6/3624* (2013.01); *G02B 6/241* (2013.01); *G02B 6/3849* (2013.01); *G02B 7/00* (2013.01)

(58) Field of Classification Search
CPC ...... G02B 6/32; G02B 6/3849; G02B 6/4204; G02B 6/4206; G02B 6/4292; G02B 6/4244; G02B 6/4245; G02B 6/4251; G02B 6/4255; G02B 6/241; G02B 6/3624; G02B 6/3807; G02B 6/3809
(Continued)

(56) References Cited

U.S. PATENT DOCUMENTS 5,467,229 A * 11/1995 Rumsey ............... G02B 6/4204
359/818
5,841,923 A * 11/1998 Kyoya ................ G02B 6/4207
385/93

(Continued)

OTHER PUBLICATIONS

"Thermal Properties of Plastic Materials", 2021, pp. 1-4 retrieved from <https://www.professionalplastics.com/professionalplastics/ThermalPropertiesofPlasticMaterials.pdf> on May 27, 2021.*

*Primary Examiner* — Michael P Mooney
(74) *Attorney, Agent, or Firm* — Harrity & Harrity, LLP

(57) ABSTRACT

An optical device may comprise an optical element holder that holds an optical element in an internal portion of the optical element holder, wherein the optical element holder includes a protruding feature with a contact portion that holds the optical element in the internal portion of the optical element holder. The optical device may additionally comprise the optical element, wherein an edge of the optical element includes a chamfered portion that contacts the contact portion of the protruding feature of the optical element holder to allow the protruding feature of the optical element holder to hold the optical element in the internal portion of the optical element holder.

20 Claims, 3 Drawing Sheets

(51) Int. Cl.
*G02B 6/38* (2006.01)
*G02B 7/00* (2021.01)

(58) Field of Classification Search
USPC ..... 385/33–34, 39, 53, 88–94; 359/811, 819
See application file for complete search history.

(56) References Cited

U.S. PATENT DOCUMENTS

| | | | | |
|---|---|---|---|---|
| 6,567,224 B2* | 5/2003 | Hatakeyama | ............ | G02B 7/02 |
| | | | | 359/819 |
| 8,049,978 B1* | 11/2011 | Su | ............ | G02B 7/02 |
| | | | | 359/819 |
| 2004/0081422 A1* | 4/2004 | Kawano | ............ | G02B 23/18 |
| | | | | 385/146 |
| 2006/0104575 A1* | 5/2006 | Ikeda | ............ | G02B 6/4266 |
| | | | | 385/88 |
| 2006/0290802 A1* | 12/2006 | Webster | ............ | H04N 5/2253 |
| | | | | 348/340 |
| 2018/0203201 A1* | 7/2018 | Navabi | ............ | G02B 7/007 |

* cited by examiner

OPTICAL ELEMENT HOLDER WITH A PROTRUDING FEATURE TO HOLD A CHAMFERED OPTICAL ELEMENT

RELATED APPLICATION

This application claims priority to U.S. Provisional Patent Application No. 62/954,234, filed on Dec. 27, 2019, and entitled "WINDOW HOLDER WITH A PROTRUDING FEATURE TO HOLD A CHAMFERED WINDOW," the content of which is incorporated by reference herein in its entirety.

TECHNICAL FIELD

The present disclosure relates generally to an optical element holder and to an optical element holder with a protruding feature to hold a chamfered optical element.

BACKGROUND

An optical system may include an optical device to transmit and/or receive an optical signal. The optical device may include a window to transmit an optical signal from the optical device.

SUMMARY

According to some implementations, an optical device may include an optical element holder that holds an optical element in an internal portion of the optical element holder, wherein the optical element holder includes a protruding feature with a contact portion that holds the optical element in the internal portion of the optical element holder; and the optical element, wherein an edge of the optical element includes a chamfered portion that contacts the contact portion of the protruding feature of the optical element holder to allow the protruding feature of the optical element holder to hold the optical element in the internal portion of the optical element holder.

According to some implementations, an optical system may include an optical element holder that holds an optical element in an internal portion of the optical element holder, wherein the optical element holder includes a protruding feature with a contact portion that holds the optical element in the internal portion of the optical element holder; and the optical element that is held within the internal portion of the optical element holder by the protruding feature, wherein an edge of the optical element includes a chamfered portion that contacts the contact portion of the protruding feature of the optical element holder.

According to some implementations, a method may include heating an optical element holder, wherein the optical element holder includes a circular opening that provides access to an internal portion of the optical element holder, wherein heating the optical element holder causes the optical element holder to expand and a diameter of the circular opening to increase; inserting, after heating the optical element holder, an optical element into the internal portion of the optical element holder via the circular opening, wherein the optical element includes an edge with a chamfered portion; and cooling, after inserting the optical element into the internal portion of the optical element holder via the circular opening, the optical element holder, wherein cooling the optical element holder causes the optical element holder to contract and causes the diameter of the opening to decrease, wherein causing the optical element holder to contract and the diameter of the circular opening to decrease causes the optical element holder to hold the optical element in the internal portion of the optical element holder.

DETAILED DESCRIPTION

Figure 1:
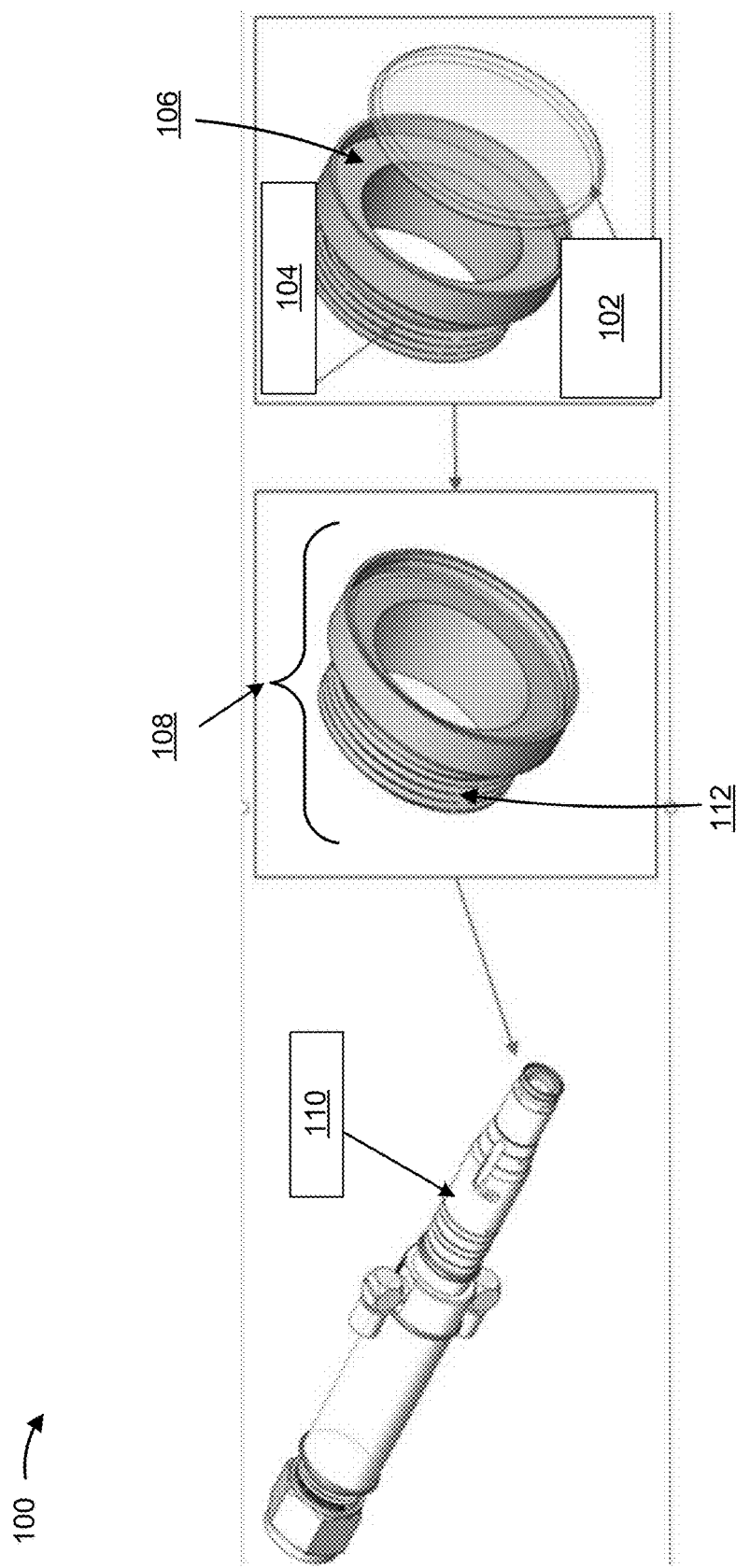
FIG. 1 is a diagram of one or more example implementations described herein.

The following detailed description of example implementations refers to the accompanying drawings. The same reference numbers in different drawings may identify the same or similar elements.

A window assembly may be used with an optical device to facilitate output of light from and/or input of light into the optical device. The window assembly may also protect the optical device (e.g., to prevent dust, dirt, contaminants, and/or the like from entering the optical device). In some cases, a window assembly may include a window holder that holds a window (e.g., a glass window) using fasteners (e.g., a window holder cover, a window holder fastening ring, and/or the like), adhesives (e.g., glues), and/or other components. However, in many cases, the fasteners, adhesives, and/or other components may affect the integrity of the window. For example, a fastener may exert too much pressure on the window and cause the window to crack. Further, in many cases, the fasteners, adhesives, and/or other components may impact a robustness and/or durability of the window. For example, a glue may break down when subject to scattered light produced by high power applications of the optical device, which may cause the window to separate from the window holder. Further, the glue may outgas, which may degrade a performance of the window assembly (e.g., by depositing a film on the window).

Some implementations described herein provide an optical element holder assembly for an optical device, an optical system, and/or the like, such as a fiber optic feed connector. The optical element holder assembly may comprise an optical element holder that holds an optical element (e.g., a window, a lens, and/or the like). The optical element holder may include a protruding feature with a contact portion that holds the optical element in an internal portion of the optical element holder. An edge of the optical element may include a chamfered portion that contacts the contact portion of the protruding feature of the optical element holder, which allows the protruding feature of the optical element holder to hold (e.g., secure) the optical element in the internal portion of the optical element holder.

In some implementations, the optical element holder may hold the optical element in the internal portion of the optical element holder via an interference fit (also referred to as a press fit, a friction fit, and/or the like). For example, the interference fit may be created by the protruding feature of the optical element holder pressing the chamfered portion of the edge of the optical element toward the internal portion of the optical element holder. In some implementations, the interference fit creates a force on the optical element in an inward direction (e.g., along a radius of the optical element, such as toward the internal portion of the optical element holder), which prevents the optical element from separating from the internal portion of the optical element holder (e.g., even due to vibrations, shocks, and/or temperature changes occurring during the use or operation of the optical device).

In this way, some implementations described herein provide an optical element holder assembly that uses a novel design to secure an optical element to an optical element holder. This allows the optical element to be secured to the optical element holder without impacting the integrity of the optical element. For example, the design reduces an amount of stress that the optical element is subjected to by the optical element holder from just holding the optical element, as opposed to other designs. In another example, the design ensures that the entirety of an outward facing surface of the optical element (e.g., a surface of the optical element not adjacent to the internal portion of the optical element holder) may be cleaned (e.g. when included in an optical device deployed in the field) without needing to disassemble the optical element holder assembly (e.g., as would be needed for an optical element holder assembly that comprises an optical element holder cover, an optical element holder fastener ring, and/or the like that covers a portion of the outward facing surface of the optical element). This may allow for more effective cleaning of the optical element holder assembly, which may improve a performance of the optical element holder assembly and/or the optical device.

Moreover, some implementations described herein provide an optical element holder assembly that secures the optical element to the optical element holder without requiring additional fasteners (e.g., an optical element holder cover, an optical element holder fastening ring, and/or the like), adhesives (e.g., glues), and/or other components, which may improve a robustness and/or durability of the optical element. For example, because the optical element holder holds the optical element via an interference fit, the optical element is not subject to other forces (e.g., that would otherwise be exerted when using additional fasteners) that may damage the optical element. As another example, the optical element holder assembly may be used in high power applications that produce scattered light that would break down glue used by other optical element assemblies. Further, the optical element holder assembly is not subject to glue outgassing, which would otherwise degrade (e.g., by depositing a film on the optical element) a performance of the optical element.

FIG. 1 is a diagram of one or more example implementations 100 described herein. As shown in FIG. 1, example 100 includes an optical element 102 and an optical element holder 104. The optical element 102 may be a transmissive optical element (e.g., that allows light to transmit through the optical element), such as a lens, a window, an etalon, and/or the like. The optical element 102 may be a glass optical element, a crystal optical element, and/or the like, that has a polygonal shape or a circular shape, such as a circular shape shown in FIG. 1. In some implementations, the optical element may comprise silica (e.g., fused silica, such as infrared grade fused silica), quartz (e.g., fused quartz, such as infrared grade fused quartz), and/or the like. Additionally, or alternatively, the optical element 102 may include one or more coatings (e.g., on one or more surfaces of the optical element 102), such as an antireflective coating, a protective coating, and/or the like. The optical element holder 104 may comprise one or more metals and/or one or more metal alloys. For example, the optical element holder may comprise aluminum, copper, steel (e.g., stainless steel), brass, bronze, and/or the like.

Figure 2:
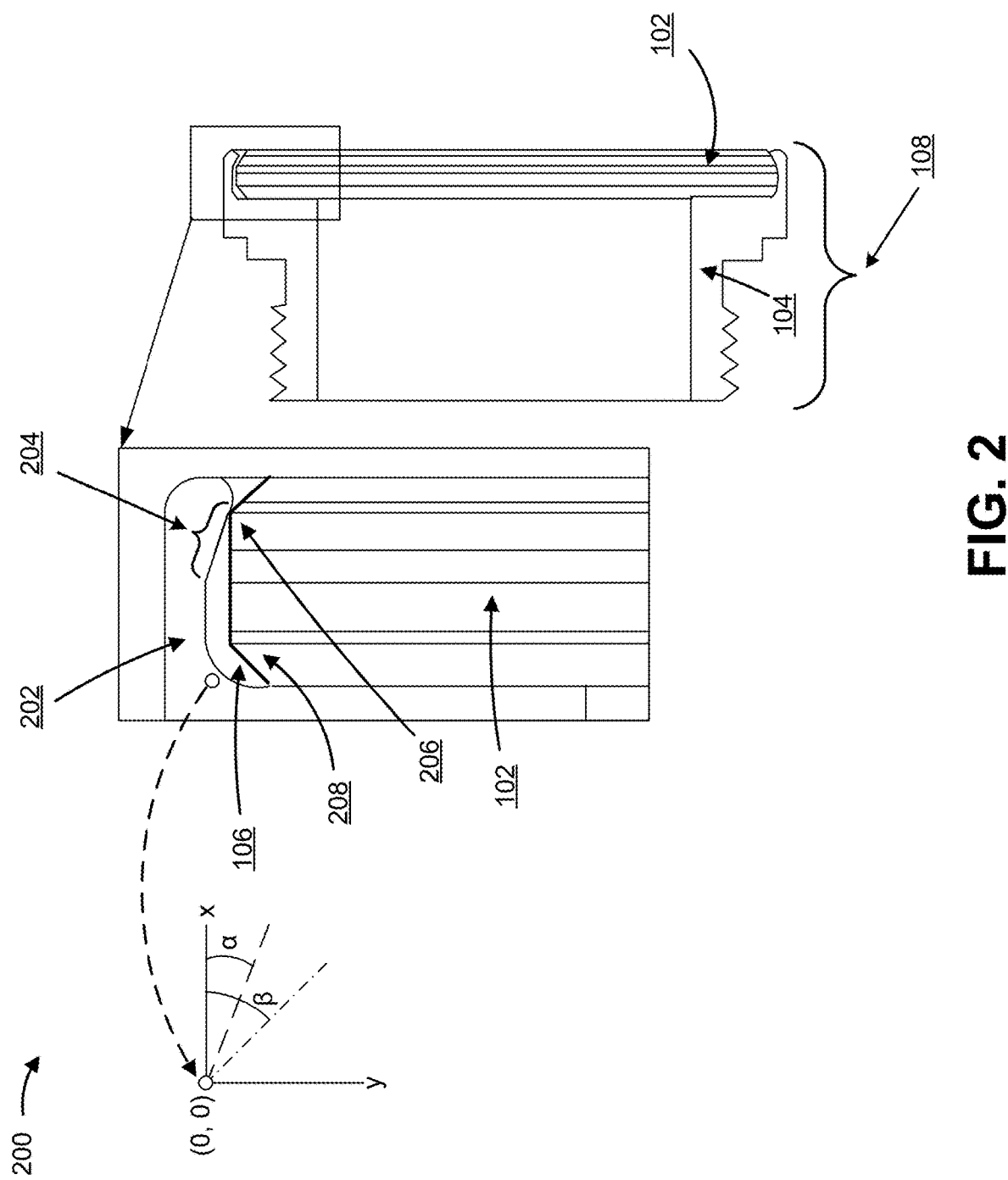
FIG. 2 is a diagram of an example optical element holder assembly described herein.

The optical element holder 104 may hold the optical element 102 in an internal portion 106 of the optical element holder 104 (e.g., using a protruding feature as further described herein in relation to FIG. 2). When the optical element 102 is held by the optical element holder 104 in the internal portion 106 of the optical element holder 104, the optical element 102 and the optical element holder 104 comprise an optical element holder assembly 108. The optical element holder assembly 108 may be included in an optical device, an optical system, and/or the like (referred to as optical system 110), such as an optical fiber connector shown in FIG. 1. Accordingly, the optical element holder assembly 108 may comprise an endcap of the optical system 110 that allows light to transmit into and/or emit from the optical system 110 and prevents dust, dirt, contaminants, and/or the like from entering the optical system 110.

In some implementations, the optical element holder 104 may include an attachment feature 112 that allows the optical element holder 104 to attach to the optical system 110 (e.g., via an attachment feature of a component of the optical system 110). For example, as shown in FIG. 1, the attachment feature 112 includes a threaded fastener portion (e.g., a threaded stem) that engages with a threaded fastener portion (e.g., a threaded barrel) of the attachment feature of the component of the optical system 110 (not shown), which enables the optical element holder 104 to attach to the optical system 110 (e.g., by enabling the optical element holder 104 to screw in to the component of the optical system 110).

As indicated above, FIG. 1 is provided merely as one or more examples. Other examples may differ from what is described with regard to FIG. 1.

FIG. 2 is a diagram 200 of an example optical element holder assembly described herein. As shown in FIG. 2, the optical element holder assembly 108 may include an optical element holder 104 that holds an optical element 102 in an internal portion 106 of the optical element holder 104. As further shown in FIG. 2 (e.g., in an exploded view of a portion of the optical element holder assembly 108 that is associated with an edge of the optical element 102), the optical element holder 104 includes a protruding feature 202 (e.g., a flange, one or more tabs, and/or one or more similar features that protrude beyond the internal portion 106 of the optical element holder 104). In some implementations, the protruding feature 202 may have a same or similar shape as the optical element 102 (e.g., a polygonal shape and/or a circular shape) and/or may define an opening to the internal portion 106 of the optical element holder 104 that has a same or similar shape as the optical element 102 (e.g., a polygonal opening and/or a circular opening). The protruding feature 202 may include a contact portion 204 (e.g., a surface of the protruding feature 202 facing the internal portion 106 of the optical element holder 104) that contacts the edge of the optical element 102.

For example, the optical element holder 104 may include a flange protruding feature 202 with a circular shape (e.g., as shown in FIG. 1) that defines a circular opening to the internal portion 106 of the optical element holder 104. The flange protruding feature 202 may include a contact portion 204 that contacts the edge of a circular optical element 102 (e.g., all along the edge of the circular optical element 102). As another example, the optical element holder 104 may include a protruding feature 202 comprising one or more tabs that define a circular opening or a polygonal opening to the internal portion 106 of the optical element holder 104. The protruding feature 202 comprising the one or more tabs may include a contact portion 204 that contacts the edge of a circular optical element 102 or a polygonal optical element 102 (e.g., at discrete points along the edge of the circular optical element 102 or the polygonal optical element 102).

The edge of the optical element 102 may include a first chamfered portion 206 that contacts the contact portion 204 of the protruding feature 202. The first chamfered portion 206 of the optical element 102 may contact the contact portion 204 of the protruding feature 202 to allow the protruding feature 202 to hold the optical element 102 in the internal portion 106 of the optical element holder 104 (e.g., via an interference fit). In some implementations, the edge of the optical element 102 may include a second chamfered portion 208 that does not contact the contact portion 204 of the protruding feature 202 (e.g., that is adjacent to the internal portion 106 of the optical element holder 104). The second chamfered portion 208 of the optical element 102 may facilitate assembling the optical element holder assembly 108, as further described herein in relation to FIG. 3.

In some implementations, the contact portion 204 of the protruding feature 202 may be tapered (e.g., sloped, angled, and/or the like) to hold the optical element 102 in the internal portion 106 of the optical element holder 104. For example, in reference to the x-y coordinate system shown in FIG. 2 (e.g., where the x-axis is parallel to an optical axis of the optical element 102, the y-axis is perpendicular to the x-axis, and an origination point (0, 0) is at a location where the protruding feature 202 meets the internal portion 106 of the optical element holder 104), the contact portion 204 of the protruding feature 202 may be associated with an angle α (e.g., an angle α between the contact portion 204 of the protruding feature 202 and the x-axis). Additionally, or alternatively, the first chamfered portion 206 of the optical element 102 may be associated with an angle β (e.g., an angle β between the first chamfered portion 206 of the optical element 102 and the x-axis).

In some implementations, the angle α may be less than or equal to the angle β, to cause the contact portion 204 of the protruding feature 202 to contact the first chamfered portion 206 of the optical element 102, which may allow the protruding feature 202 to hold the optical element 102 in the internal portion 106 of the optical element holder 104. For example, the angle α and the angle β may each have a value of 23 degrees, which allows the contact portion 204 of the protruding feature 202 to contact the first chamfered portion 206 of the optical element 102 along the length of the first chamfered portion 206. Additionally, or alternatively, in order to ensure a secure fit of the optical element 102 in the internal portion 106 of the optical element holder 104, a difference between the angle α and the angle β may satisfy (e.g., be less than or equal to) a threshold. For example, the angle α may have a value of 20 degrees and the angle β may have a value of 35 degrees, where the difference (15 degrees) is less than a 20 degree threshold that ensures a secure fit.

As indicated above, FIG. 2 is provided merely as an example. Other examples may differ from what is described with regard to FIG. 2.

Figure 3:
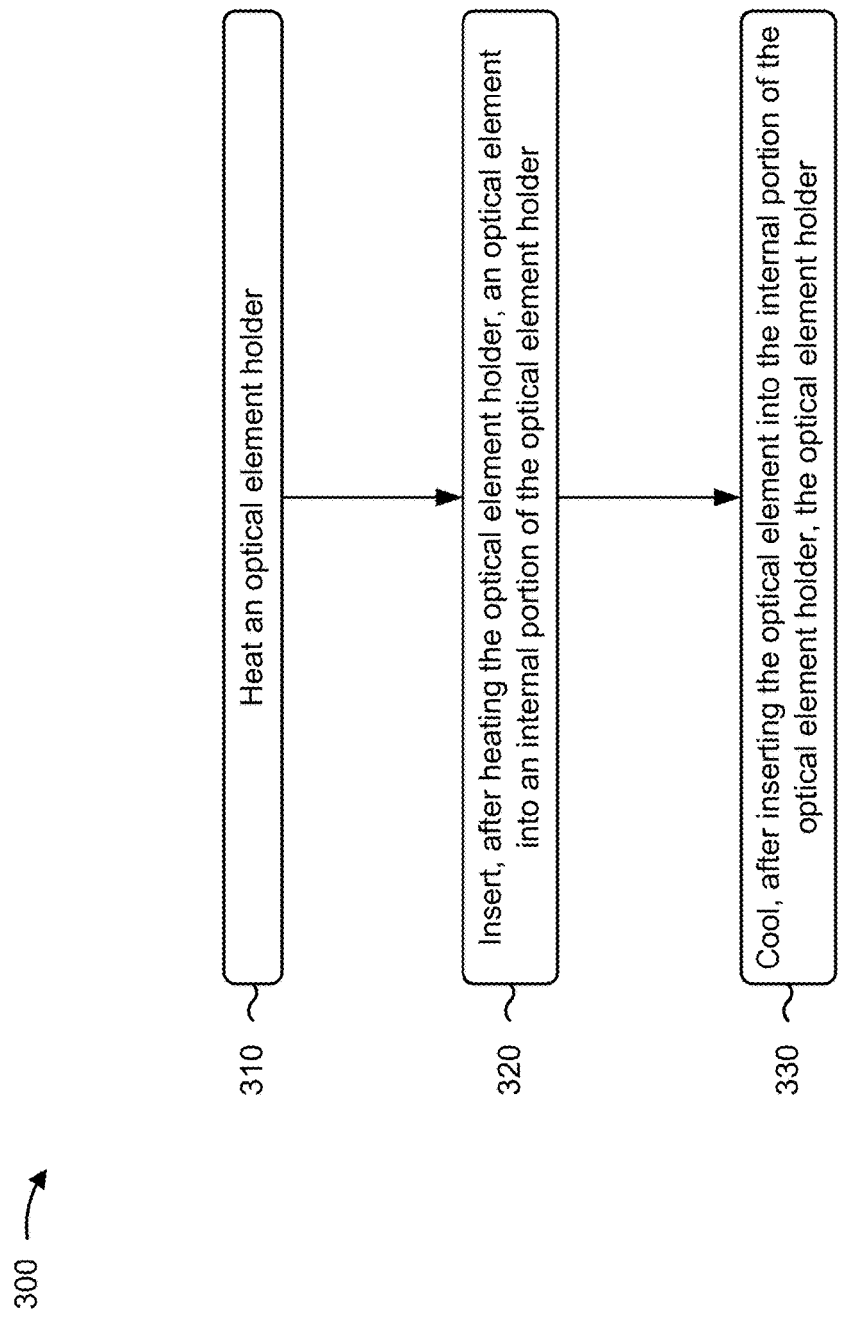
FIG. 3 is a flow chart of an example process relating to assembling an optical element holder assembly described herein.

FIG. 3 is a flow chart of an example process 300 relating to assembling an optical element holder assembly. For example, FIG. 3 shows an example process 300 for assembling the optical element holder assembly 108 that includes the optical element 102 and the optical element holder 104.

As shown in FIG. 3, process 300 may include heating an optical element holder (block 310). For example, process 300 may include heating the optical element holder 104. In some implementations, the optical element holder 104 includes a circular opening (e.g., as shown in FIG. 1) that provides access to the internal portion 106 of the optical element holder 104. In some implementations, a diameter of the circular opening is defined by the protruding feature 202 of the optical element holder 104, and heating the optical element holder 104 causes the optical element holder 104 to expand and the diameter of the circular opening to increase.

As further shown in FIG. 3, process 300 may include inserting, after heating the optical element holder, an optical element into an internal portion of the optical element holder (block 320). For example, process 300 may include inserting, after heating the optical element holder 104, the optical element 102 into the internal portion 106 of the optical element holder 104 via the circular opening. In some implementations, the optical element 102 is circular (e.g., a circular lens, a circular window, and/or the like) to allow the optical element 102 to be inserted into the internal portion 106 of the optical element holder 104 via the circular opening. In some implementations, a coefficient of thermal expansion of the optical element 102 is less than a coefficient of thermal expansion of the optical element holder 104 (e.g., to allow the optical element holder 104 to expand due to the heating process and to allow the optical element 102 to not expand or to expand less than the optical element holder 104, which facilitates inserting the optical element 102 into the internal portion 106 of the optical element holder 104 via the circular opening).

In some implementations, the optical element 102 includes an edge with the first chamfered portion 206. In some implementations, the edge of the optical element 102 includes the second chamfered portion 208, which may facilitate inserting the optical element 102 into the internal portion 106 of the optical element holder 104 (e.g., by preventing the edge of the optical element from hitting and/or getting caught on the protruding feature 202 of the optical element holder 104 when inserting the optical element 102 into the internal portion 106 of the optical element holder 104).

As further shown in FIG. 3, process 300 may include cooling, after inserting the optical element into the internal portion of the optical element holder, the optical element holder (block 330). For example, process 300 may include cooling, after inserting the optical element 102 into the internal portion 106 of the optical element holder 104 (e.g., via the circular opening), the optical element holder 104, as described above. Cooling the optical element holder 104 may be an active process (e.g., actively cooling the optical element holder 104) or a passive process (e.g., allowing the optical element holder 104 to return to room temperature after inserting the optical element 102 into the internal portion 106 of the optical element holder 104).

In some implementations, cooling the optical element holder 104 causes the optical element holder 104 to contract and causes the diameter of the opening to decrease. In some implementations, causing the optical element holder 104 to contract and the diameter of the circular opening to decrease causes the first chamfered portion 206 of the edge of the optical element 102 to contact the contact portion 204 of the protruding feature 202 of the optical element holder 104, which causes the protruding feature 202 of the optical element holder 104 to hold the optical element 102 in the internal portion 106 of the optical element holder 104 (e.g., via an interference fit).

In some implementations, rather than heating an optical element holder, inserting an optical element into an internal portion of the optical element holder, and cooling the optical element holder, process 300 may include cooling the optical element (e.g., to cause the optical element to contract), inserting the optical element into the internal portion of the optical element holder, and heating the optical element (e.g., to cause the optical element to expand). For example, process 300 may include cooling the optical element 102 (e.g., while keeping the optical element holder 104 at a set temperature, such as room temperature), inserting, after cooling the optical element 102, the optical element 102 into the internal portion 106 of the optical element holder 104 (e.g., in a similar manner as that described herein in relation to block 320), and heating the optical element 102 to allow the first chamfered portion 206 of the edge of the optical element 102 to contact the contact portion 204 of the protruding feature 202 of the optical element holder 104, which may cause the protruding feature 202 of the optical element holder 104 to hold the optical element 102 in the internal portion 106 of the optical element holder 104 (e.g., in a similar manner as that described herein in relation to block 330). Heating the optical element 102 may be may be an active process (e.g., actively heating the optical element 102) or a passive process (e.g., allowing the optical element 102 to return to room temperature after inserting the optical element 102 into the internal portion 106 of the optical element holder 104)

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical device, comprising:
   an optical element holder that holds an optical element in an internal portion of the optical element holder,
      wherein the optical element holder includes a protruding feature with a contact portion that holds the optical element in the internal portion of the optical element holder; and
   the optical element,
      wherein an edge of the optical element includes a chamfered portion that contacts the contact portion of the protruding feature of the optical element holder to allow the protruding feature of the optical element holder to hold the optical element in the internal portion of the optical element holder, and
      wherein the chamfered portion provides a transition from the edge of the optical element to a front face of the optical element, and an angle of the chamfered portion, relative to a plane parallel with the front face of the optical element, is less than 90 degrees.

2. The optical device of claim 1, wherein an angle associated with the contact portion of the protruding feature of the optical element holder is less than or equal to the angle of the chamfered portion.

3. The optical device of claim 1, wherein the protruding feature of the optical element holder comprises a tab and the optical element comprises a circular or a polygonal shape.

4. The optical device of claim 1, wherein a coefficient of thermal expansion of the optical element holder is greater than a coefficient of thermal expansion of the optical element.

5. The optical device of claim 1, wherein the optical element is a transmissive optical element that comprises silica or quartz.

6. The optical device of claim 1, wherein the optical element is a glass optical element or a crystal optical element that includes an antireflective coating or a protective coating.

7. The optical device of claim 1, wherein the edge of the optical element includes an additional chamfered portion adjacent to the internal portion of the optical element holder, and wherein the additional chamfered portion does not contact the contact portion of the protruding feature.

8. An optical system, comprising:
   an optical element holder that holds an optical element in an internal portion of the optical element holder, wherein the optical element holder includes a protruding feature with a contact portion that holds the optical element in the internal portion of the optical element holder; and the optical element that is held within the internal portion of the optical element holder by the protruding feature, wherein an edge of the optical element includes a chamfered portion that contacts the contact portion of the protruding feature of the optical element holder, and wherein the chamfered portion provides a transition from the edge of the optical element to a front face of the optical element, and an angle of the chamfered portion, relative to a plane parallel with the front face of the optical element, is less than 90 degrees.

9. The optical system of claim 8, wherein the optical system is an optical fiber connector.

10. The optical system of claim 8, wherein the optical element is a lens or a window.

11. The optical system of claim 8, wherein a first angle is associated with the contact portion of the protruding feature of the optical element holder, and wherein a difference between the first angle and the angle of the chamfered portion satisfies a threshold.

12. The optical system of claim 8, wherein the protruding feature of the optical element holder comprises a circular flange and the optical element comprises a circular window.

13. The optical system of claim 8, wherein the contact portion of the protruding feature of the optical element holder is tapered to hold the optical element in the internal portion of the optical element holder via an interference fit.

14. The optical system of claim 8, wherein the optical element holder includes an attachment feature that attaches the optical element holder to an attachment feature of another component of the optical system.

15. The optical system of claim 14, wherein the attachment feature of the optical element holder includes a threaded fastener portion that engages with a threaded fastener portion of the attachment feature of the other component of the optical system.

16. A method of assembling an optical device, comprising:

heating an optical element holder, wherein the optical element holder includes a circular opening that provides access to an internal portion of the optical element holder, wherein heating the optical element holder causes the optical element holder to expand and a diameter of the circular opening to increase;

inserting, after heating the optical element holder, an optical element into the internal portion of the optical element holder via the circular opening, wherein the optical element includes an edge with a chamfered portion that provides a transition from the edge to a front face of the optical element, and an angle of the chamfered portion, relative to a plane parallel with the front face of the optical element, is less than 90 degrees; and cooling, after inserting the optical element into the internal portion of the optical element holder via the circular opening, the optical element holder, wherein cooling the optical element holder causes the optical element holder to contract and causes the diameter of the opening to decrease, wherein causing the optical element holder to contract and the diameter of the circular opening to decrease causes the optical element holder to hold the optical element in the internal portion of the optical element holder.

17. The method of claim 16, wherein the diameter of the circular opening is defined by a protruding feature of the optical element holder with a contact portion, and wherein cooling the optical element holder to cause the optical element holder to contract and the diameter of the circular opening to decrease causes the chamfered portion to contact the contact portion of the protruding feature of the optical element holder.

18. The method of claim 17, wherein causing the chamfered portion to contact the contact portion of the protruding feature of the optical element holder causes the protruding feature of the optical element holder to hold the optical element in the internal portion of the optical element holder via an interference fit.

19. The method of claim 16, wherein the optical element is a circular lens or a circular window.

20. The method of claim 16, wherein a coefficient of thermal expansion of the optical element is less than a coefficient of thermal expansion of the optical element holder.

* * * * *